United States Patent
Kurashige

(10) Patent No.: US 9,635,388 B2
(45) Date of Patent: Apr. 25, 2017

(54) MOVING IMAGE ENCODING DEVICE, MOVING IMAGE ENCODING METHOD, AND COMPUTER PROGRAM PRODUCT

(71) Applicant: JVC KENWOOD Corporation, Yokohama-shi (JP)

(72) Inventor: Hiroyuki Kurashige, Yokosuka (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 280 days.

(21) Appl. No.: 14/283,131

(22) Filed: May 20, 2014

(65) Prior Publication Data

US 2014/0348226 A1    Nov. 27, 2014

(30) Foreign Application Priority Data

May 22, 2013 (JP) .................................. 2013-107894

(51) Int. Cl.
*H04N 19/86* (2014.01)
*H04N 19/436* (2014.01)
*H04N 19/61* (2014.01)

(52) U.S. Cl.
CPC ........... *H04N 19/86* (2014.11); *H04N 19/436* (2014.11); *H04N 19/61* (2014.11)

(58) Field of Classification Search
CPC ................................................ H04N 19/86
See application file for complete search history.

(56) References Cited

U.S. PATENT DOCUMENTS

| 8,723,917 B2 * | 5/2014 | Ohki | G06K 9/32 348/36 |
| 2004/0080670 A1 * | 4/2004 | Cheatle | H04N 1/3872 348/441 |
| 2005/0053302 A1 * | 3/2005 | Srinivasan | H04N 19/52 382/248 |
| 2006/0262994 A1 * | 11/2006 | Patera | G06T 3/4084 382/276 |

FOREIGN PATENT DOCUMENTS

JP    08-046961    2/1996

OTHER PUBLICATIONS

"Information technology—Coding of audio-visual objects—" Part 10: Advanced Video Coding ISO/IEC 14496-10:2004(E), Oct. 1, 2004.

* cited by examiner

*Primary Examiner* — James Pontius
(74) *Attorney, Agent, or Firm* — Venable LLP; Michael A. Sartori; Laura G. Remus

(57) ABSTRACT

Provided is a moving image encoding device including an encoding unit which includes: a local decoding image signal generating unit; a filtering unit; and a control unit configured to divide a screen of the local decoding image signal, in a horizontal or a vertical direction, into a first area serving as the overlapping boundary areas, a second area adjacent to the first area, and other areas, to encode the first area of the first small image and the second area of the second small image with a same encoding parameter, to encode the second area of the first small image and the first area of the second small image with a same encoding parameter, and to perform orthogonal transform on the second area of the first small image and the first area of the second small image in the unit of the orthogonal transform block of the second size.

2 Claims, 9 Drawing Sheets

MOVING IMAGE ENCODING DEVICE, MOVING IMAGE ENCODING METHOD, AND COMPUTER PROGRAM PRODUCT

CROSS-REFERENCE TO RELATED APPLICATIONS

The present application claims priority to and incorporates by reference the entire contents of Japanese Patent Application No. 2013-107894 filed in Japan on May 22, 2013.

BACKGROUND OF THE INVENTION

1. Field of the Invention

The present invention relates to a moving image encoding device and a moving image encoding method, and in particular to a moving image encoding device, a moving image encoding method, and a computer program product including moving image encoding program that divide an image to perform encoding by a plurality of encoding units.

2. Description of the Related Art

To record a moving image on a recording medium or transmit a moving image via a network these days, the moving image is encoded. Typical examples of such an encoding method include moving picture experts group phase 4 Part10: advanced video coding (MPEG-4 AVC) (refer to ISO/IEC14496-10:2004, Information technology—Coding of audio-Visual objects—Part10: Advanced Video Coding).

MPEG-4 AVC divides an image into macroblocks (hereinafter, referred to as MBs) to perform processing. An MB is a unit of 16 pixels in the horizontal direction and 16 pixels in the vertical direction (hereinafter, referred to as 16×16 pixels) in a luminance component. MPEG-4 AVC further divides the pixels in the MB into blocks to perform predictive encoding and discrete cosine transform (DCT), which is an example of orthogonal transform. DCT is performed in units of DCT blocks composed of 4×4 pixels or 8×8 pixels. The result of DCT is quantized and is subjected to variable length encoding.

To reduce block noise, MPEG-4 AVC includes processing called deblock filtering in standards. Block noise is generated by performing quantization on the result of DCT in encoding, and performing inverse quantization in decoding, which makes block boundaries visually conspicuous. Deblock filtering is a kind of filtering performed on pixels on the block boundaries to reduce block noise.

With the improvement in image definition, loads on moving image encoding devices have been increasing. To address this, a technology for improving the performance of moving image encoding devices has been desired. MPEG-4 AVC can perform parallel processing by dividing a picture into a plurality of slices. A slice is a unit of one MB at the minimum and all the MBs in the screen at the maximum. By operating a plurality of moving image encoding devices having a lower arithmetic capacity in parallel operation, it is possible to perform encoding at a lower cost compared with the case where another high-performance moving image encoding device is provided.

Simply performing parallel processing by dividing an image into slices makes slice boundaries formed by the division visually conspicuous because of block noise or the like generated by the moving image encoding processing.

To address this, Japanese Laid-open Patent Publication No. 8-46961 discloses a conventional method for dividing an image such that boundary areas overlap with each other and performing encoding. The method disclosed in Japanese Laid-open Patent Publication No. 8-46961 gives a weighted average to the overlapping areas to smoothly connect the areas in decoding, thereby making boundary lines generated on the boundaries inconspicuous.

The method for encoding and decoding a moving image disclosed in Japanese Laid-open Patent Publication No. 8-46961, however, needs special processing to process the overlapping areas in decoding. Because typical decoding devices conforming to MPEG-4 AVC, which are widely used, are incapable of performing such processing, another dedicated decoding device is required.

SUMMARY OF THE INVENTION

There is a need to at least partially solve the problems in the conventional technology.

Provided is a moving image encoding device that divides an input image of a digital image signal to be encoded into a plurality of small images of which boundary areas overlap with each other; that inputs the small images obtained by division into an encoding unit in parallel to acquire encoded data; that combines the encoded data that is excluded of an overlapping area therefrom; and that outputs the combined encoded data as encoded data of the input image. The encoding unit includes: a difference value generating unit configured to generate a difference value between the input small images and a prediction signal obtained by motion compensation prediction or in-screen prediction; an orthogonal transform unit configured to perform orthogonal transform on the difference value in a unit of an orthogonal transform block of a first size determined in advance or in a unit of an orthogonal transform block of a second size that is larger than the first size; a quantization unit configured to perform quantization on transform coefficient obtained by the orthogonal transform performed by the orthogonal transform unit and to generate a quantized signal; a local decoding image signal generating unit configured to add a signal obtained by performing inverse quantization and inverse orthogonal transform on the quantized signal to the prediction signal, and to generate a local decoding image signal; a filtering unit configured to perform filtering on the local decoding image signal based on the size of the orthogonal transform block so as to reduce block noise; and a control unit configured to divide a screen of the local decoding image signal, in a horizontal direction or a vertical direction, into a first area serving as the overlapping boundary areas, a second area that is adjacent to the first area, and other areas that are other than the first and second area, to encode, in a first small image out of the small images and a second small image including a boundary area overlapping with the first small image, the first area of the first small image and the second area of the second small image with a same encoding parameter, to encode the second area of the first small image and the first area of the second small image with a same encoding parameter, and to set an instruction to perform orthogonal transform on the second area of the first small image and the first area of the second small image in the unit of the orthogonal transform block of the second size.

Provided further is a moving image encoding method that includes: encoding step that divides an input image of a digital image signal to be encoded into a plurality of small images of which boundary areas overlap with each other; that carries out an encoding operation in parallel on the small images obtained by the division to acquire encoded data; that combines the encoded data that is excluded of an overlapping area therefrom; and that outputs the combined encoded data as encoded data of the input image. The encoding operation includes: generating a difference value between the input small images and a prediction signal obtained by motion compensation prediction or in-screen prediction; performing orthogonal transform on the difference value in a unit of an orthogonal transform block of a first size determined in advance or in a unit of an orthogonal transform block of a second size that is larger than the first size; performing quantization on transform coefficient obtained by the orthogonal transform at the performing of orthogonal transform, thereby generating a quantized signal; adding a signal obtained by performing inverse quantization and inverse orthogonal transform on the quantized signal to the prediction signal, thereby generating a local decoding image signal; performing filtering on the local decoding image signal based on the size of the orthogonal transform block, thereby reducing block noise; dividing a screen of the local decoding image signal, in a horizontal direction or a vertical direction, into a first area serving as the overlapping boundary areas, a second area that is adjacent to the first area, and other areas that are other than the first and second area; setting and instructing to encode, in a first small image out of the small images and a second small image including a boundary area overlapping with the first small image, the first area of the first small image and the second area of the second small image with a same encoding parameter and to encode the second area of the first small image and the first area of the second small image with a same encoding parameter; and setting and instructing to perform orthogonal transform on the second area of the first small image and the first area of the second small image in the unit of the orthogonal transform block of the second size.

Provided still further is a computer program product that includes computer usable medium having computer-readable program codes embodied in the medium for a moving image encoding method. The program codes when executed causes a computer to execute the moving image encoding method mentioned above.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
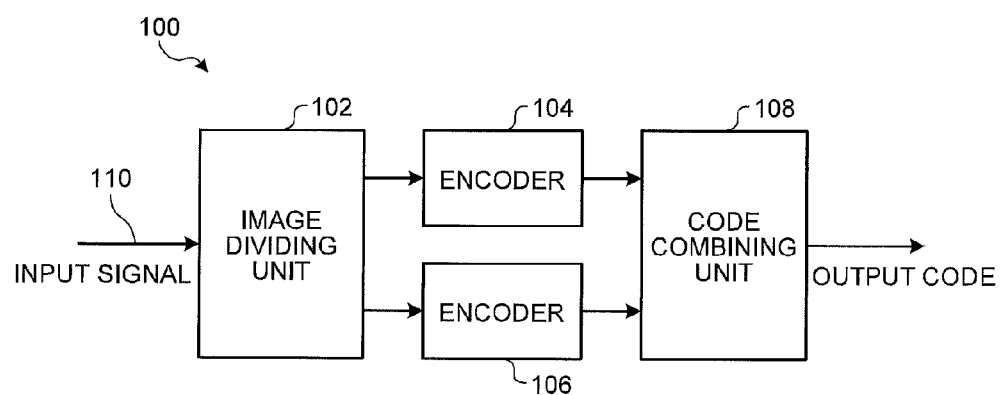
FIG. 1 is a diagram of a configuration of a moving image encoding device according to a first embodiment.

Exemplary embodiments of a moving image encoding device are described below. While the embodiments each describe an example in which MPEG-4 AVC is used as a moving image encoding standard, the embodiment is not limited thereto. Specific numerical values and the like in the embodiments are given by way of example to facilitate understanding of the embodiment and are not intended to limit the invention, except as otherwise specified. In the present specification and drawings, components having substantially the same function and configuration are represented by same reference numerals, and an overlapping explanation thereof will be omitted. Components not directly relating to the embodiment are not illustrated.

First Embodiment

FIG. 1 is a block diagram of a moving image encoding device according to a first embodiment. A moving image encoding device 100 according to the present embodiment divides a moving image to be encoded into two in a screen. The moving image encoding device 100 performs moving image encoding on the images obtained by the division and combines two encoded outputs obtained as the encoding result. The moving image encoding device 100 combines the encoded outputs such that the thus-combined encoded outputs can be decoded in the same manner as in the case where the moving image encoding is performed on the image yet to be divided. The moving image encoding device 100 sets various types of encoding parameter values.

Figure 2:
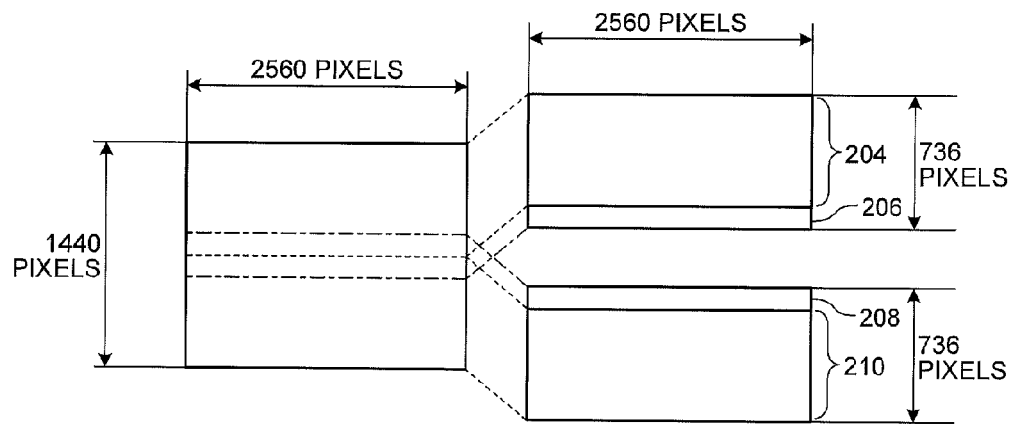
FIG. 2 is a view for explaining division of a moving image according to the first embodiment.

Each image of the moving image to be encoded is composed of 2560×1440 pixels. The explanation will be made of the luminance component of the image alone. An input signal 110 is input into an image dividing unit 102 in FIG. 1. Each image of moving image data is divided into two upper and lower small images by the image dividing unit 102 in a manner overlapping with each other by one MB line. As illustrated in FIG. 2, each small image is composed of 2560×736 pixels. The upper small image obtained by the division is formed of an area 204 and an area 206. The area 204 corresponds to the upper half of the original image. The area 206 serves as an MB line positioned below the area 204 and is composed of 2560×16 pixels. The lower small image obtained by the division is formed of an area 210 and an area 208. The area 210 corresponds to the lower half of the original image. The area 208 serves as an MB line positioned above the area 210 and is composed of 2560×16 pixels. The MB line 206 overlaps with the lower small image, whereas the MB line 208 overlaps with the upper small image.

Figure 3:
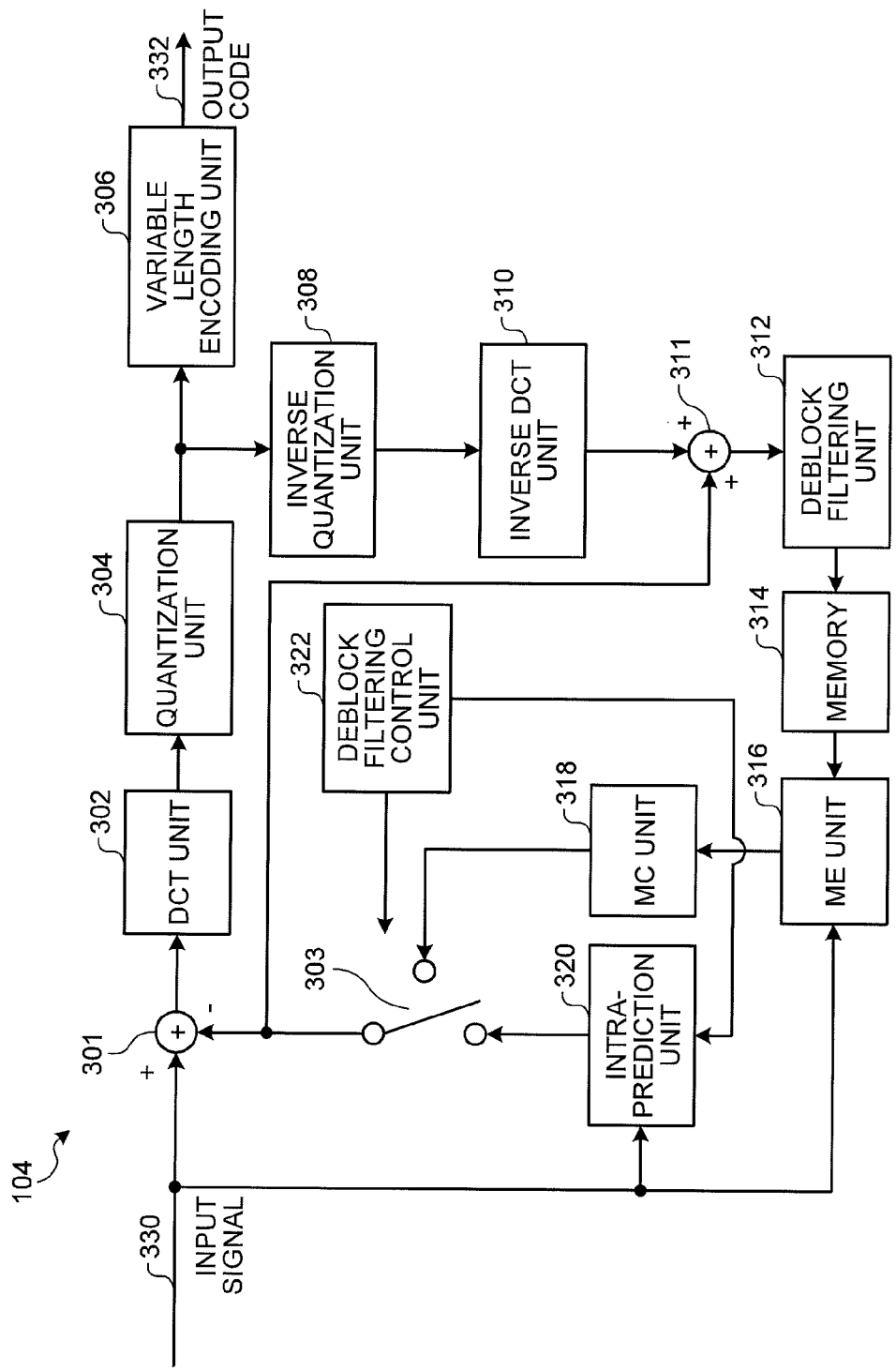
FIG. 3 is a block diagram of an encoder according to the first embodiment.

The upper small moving image data obtained by the division is output to an encoder 104, whereas the lower small moving image data is output to an encoder 106. FIG. 3 illustrates the configuration of the encoder 104. The encoders 104 and 106 perform encoding in conformity with MPEG-4 AVC. Because MPEG-4 AVC refers to an image as a picture, the term "picture" is used here. The small images obtained by the division are each referred to as a small picture to distinguish the small image from the image yet to be divided.

The upper small moving image data obtained by the division is input into the encoder 104 in FIG. 3 as an input signal 330. The input signal 330 is input into a subtractor 301, an intra-prediction unit 320, and a motion vector estimation (ME) unit 316. The subtractor 301 generates a difference value between the input signal 330 serving as a moving image signal to be encoded and an in-screen (intra) prediction signal or an inter-screen (inter) prediction signal supplied via a switch 303 as needed in predetermined encoding units (blocks in the present embodiment). The in-screen prediction signal is a prediction signal based on an intra-prediction generated by the intra-prediction unit 320. The inter-screen prediction signal is a prediction signal based on an inter prediction generated by the ME unit 316 and a motion compensation (MC) unit 318.

The intra-prediction unit 320 performs intra prediction with a known prediction method based on the input signal 330 to be encoded. In typical intra prediction, a prediction mode is determined depending on a prediction direction and the pixel size of a block with which the prediction is performed. In the present embodiment, the prediction mode is further restricted by an instruction from a deblock filtering control unit 322, which will be described later.

MPEG-4 AVC has three types of prediction modes depending on the pixel size of a block with which the intra prediction is performed, which the pixel size includes 4×4 pixels, 8×8 pixels, and 16×16 pixels. In the mode for performing prediction in units of blocks of 4×4 pixels or 16×16 pixels, it is determined that discrete cosine transform (DCT) is performed in units of blocks of 4×4 pixels by a DCT unit 302, which will be described later. In the mode for performing prediction in units of blocks of 8×8 pixels, it is determined that DCT is performed in units of blocks of 8×8 pixels.

The ME unit 316 and the MC unit 318 perform inter prediction with a known prediction method based on the input signal 330 to be encoded and local decoding image data output from a memory 314. There are two types of prediction methods for inter prediction: P prediction (predictive) that uses a single reference small picture alone; and B prediction (bi-predictive) that uses at most two reference small pictures.

It can be determined in units of slices: whether to select an output from the intra-prediction unit 320 or an output from the MC unit 318 with the switch 303; and whether to use the P prediction or the B prediction as the inter prediction in the MC unit 318. A slice on which only the intra prediction is performed is referred to as an I slice; a slice on which one of the intra prediction and the P prediction is performed is referred to as a P slice, and a slice on which any one of the intra prediction, the P prediction, and the B prediction is performed is referred to as a B slice.

The selection described above can also be determined in units of small pictures. A small picture formed of only the I slices is referred to as an I small picture; a small picture formed of only the P slices is referred to as a P small picture; and a small picture formed of only the B slices is referred to as an B small picture.

The DCT unit 302 performs DCT (Discrete Cosine Transform), which is an example of orthogonal transform, on the difference value output from the subtractor 301 in units of a DCT block size. The DCT block size can be variably controlled to a size of four pixels in the horizontal direction and four pixels in the vertical direction (that is, 4×4 pixels) or a size of eight pixels in the horizontal direction and eight pixels in the vertical direction (that is, 8×8 pixels), for example, depending on the input signal 330 to be encoded.

A quantization unit 304 performs quantization on a DCT coefficient output from the DCT unit 302, thereby generating a quantized signal. An inverse quantization unit 308 performs inverse quantization on the quantized signal. An inverse DCT unit 310 performs inverse DCT on the signal output from the inverse quantization unit 308 to generate a decoded signal of the difference value and supplies the decoded signal to an adder 311. The adder 311 adds an in-screen prediction signal or an inter-screen prediction signal supplied via the switch 303 to the decoded signal, thereby generating a local decoding image signal.

A deblock filtering unit 312 performs deblock filtering to reduce block noise in MB units on the local decoding image signal supplied from the adder 311. The deblock filtering unit 312 then stores the signal subjected to the filtering in the memory 314 as a reference image signal. The filtering performed by the deblock filtering unit 312 will be described later in detail.

The ME unit 316 reads the reference image signal stored in the memory 314 to perform inter prediction. The ME unit 316 then performs motion estimation (ME) to detect a motion vector indicating a relative position of a block in the reference image signal and a block corresponding thereto in the input signal 330. The MC unit 318 performs MC based on the motion vector output from the ME unit 316, thereby generating an inter-screen prediction signal. A variable length encoding unit 306 performs variable length encoding on the quantized signal, thereby generating and outputting an output code 332.

The data amount of the output code 332 varies depending on the magnitude of a quantization step in the quantization performed by the quantization unit 304. MPEG-4 AVC represents the quantization step as quantization parameter. The quantization parameter may be variably controlled so as to make the amount of encoded moving image data closer to a predetermined amount or may be fixed in encoding.

The configuration of the encoder 106 is the same as that illustrated in FIG. 3.

The output code subjected to variable length encoding in the encoder 104 and the output code subjected to variable length encoding in the encoder 106 are received by a code combining unit 108. The code combining unit 108 combines the output code subjected to the variable length encoding in the encoder 104 and the output code subjected to the variable length encoding in the encoder 106 for each picture. The combined encoded data is similar to encoded data obtained when one picture not being divided is processed by one encoder 104 and subjected to variable length encoding.

The code combining unit 108 adds header information, such as sequence parameter set (hereinafter, referred to as SPS), picture parameter set (PPS), and supplemental enhancement information (SEI), to the encoded data and outputs the encoded data. These pieces of header information are information based on the pixel size of a picture not being divided (2560×1440 pixels in the present embodiment).

Processing featured in the present embodiment will be described with reference to FIG. 4 and FIG. 5.

To simplify the explanation, an assumption is made that encoding is performed on one picture as I picture of two pictures in a moving image and another picture as P picture in this example. In the example, the encoding is performed with a fixed quantization parameter. The encoder 104 and the encoder 106 use the same quantization parameter.

If the moving image encoding device 100 illustrated in FIG. 1 receives moving image data, the moving image encoding device 100 encodes the I picture first. As described above, the I picture is divided into two upper and lower images by the image dividing unit 102 in a manner overlapping with each other by one MB line; and the images are each formed as a small image of 2560×736 pixels.

Figure 4:
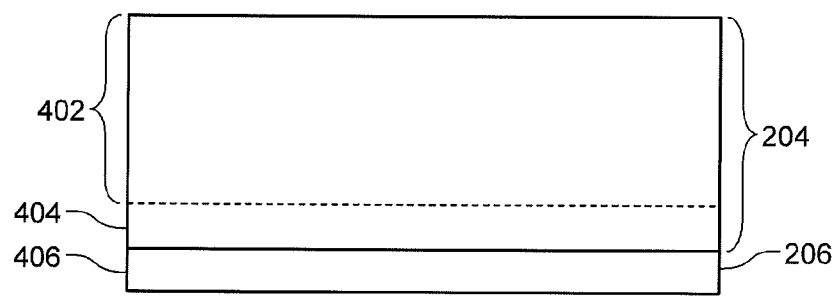
FIG. 4 is a view for explaining encoding of an upper image obtained by the division according to the first embodiment.

The upper small image is input into the encoder 104 and is segmented into three areas 402, 404, and 406 as illustrated in FIG. 4. These three areas each serve as a slice. The area 402 is a slice composed of 2560×704 pixels, the area 404 is a slice composed of 2560×16 pixels, and the area 406 is a slice composed of 2560×16 pixels.

The deblock filtering control unit 322 illustrated in FIG. 3 controls the intra-prediction unit 320 and the switch 303 such that the slices 402 and 406 are encoded as normal I slices and that the slice 404 is encoded as an I slice of intra 8×8.

Encoding of a slice as a normal I slice is performed as follows: the switch 303 selects the intra-prediction unit 320 for all the blocks of the slice; the intra-prediction unit 320 determines one mode from a plurality of intra-prediction modes; and the DCT unit 302 performs DCT based on a DCT size in accordance with the determined intra-prediction mode.

Encoding of a slice as an I slice of intra 8×8 is performed as follows: the intra-prediction mode is fixed to the mode for performing prediction in units of blocks of 8×8 pixels; and operations other than the fixation of that mode are carried out in the same manner as in the case of the normal I slice. In the mode for performing prediction in units of blocks of 8×8 pixels, it is determined that DCT is performed in units of blocks of 8×8 pixels as described above.

The DCT coefficient serving as an output from the DCT unit 302 is quantized by the quantization unit 304 and is input into the variable length encoding unit 306 and the inverse quantization unit 308. The variable length encoding unit 306 performs variable length encoding on the slices 402 and 404 but performs no variable length encoding on the slice 406. Thus, the output code 332 output from the variable length encoding unit 306 corresponds to encoded data of the upper half of the input image, that is, of an image composed of 2560×720 pixels.

The processing of the inverse quantization unit 308 and other processing are performed on the slice 406 as well.

Figure 5:
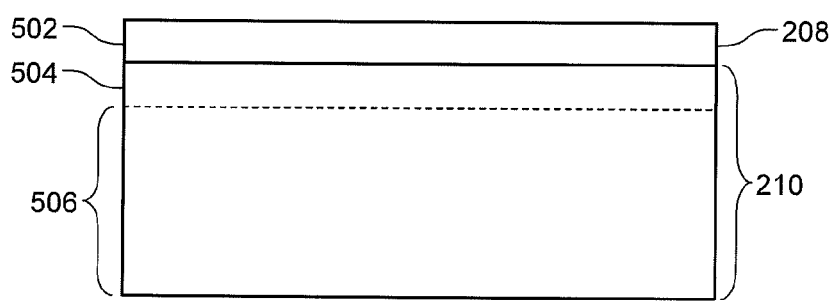
FIG. 5 is a view for explaining encoding of a lower image obtained by the division according to the first embodiment.

The lower small image is input into the encoder 106 and is segmented into three areas 502, 504, and 506 as illustrated in FIG. 5. The area 502 is composed of 2560×16 pixels, the area 504 is composed of 2560×16 pixels, and the area 506 is composed of 2560×704 pixels. The MB line 502 serves as one slice, whereas the areas 504 and 506 each serve as a slice. While the areas 504 and 506 are not necessarily different slices and may be one slice, an assumption is made that the areas 504 and 506 are different slices to simplify the explanation.

The deblock filtering control unit 322 controls the intra-prediction unit 320 and the switch 303 such that the slice 502 is encoded as an I slice of intra 8×8 and such that the slices 504 and 506 are encoded as normal I slices.

The variable length encoding unit 306 performs no variable length encoding on the slice 502 but performs variable length encoding on the slices 504 and 506. Thus, an output from the variable length encoding unit 306 corresponds to encoded data of the lower half of the input image, that is, of an image composed of 2560×720 pixels.

The processing of the inverse quantization unit 308 and other processing are performed on the slice 502 as well.

Subsequently, the P picture is encoded. As described above, the P picture is divided into two upper and lower images by the image dividing unit 102 in a manner overlapping with each other by one MB line, and the images are each formed as a small image of 2560×736 pixels.

The upper small image is input into the encoder 104 and is segmented into three areas 402, 404, and 406 as illustrated in FIG. 4. These three areas each serve as a slice. The area 402 is a slice composed of 2560×704 pixels, the area 404 is a slice composed of 2560×16 pixels, and the area 406 is a slice composed of 2560×16 pixels.

The deblock filtering control unit 322 controls the intra-prediction unit 320 and the switch 303 such that the slice 402 is encoded as a normal P slice, that the slice 404 is encoded as an I slice of intra 8×8, and that the slice 406 is encoded as a normal I slice.

Encoding of a slice as a normal P slice is performed for all the blocks of the slice as follows: an optimum intra-prediction mode is determined by the intra-prediction unit 320, and an inter-prediction mode is determined by performing ME and MC operations with the reference image stored in the memory; the switch 303 selects one prediction mode from the intra-prediction result and the inter-prediction result; and the DCT unit 302 performs DCT operation based on a DCT size in accordance with the prediction mode.

The search range of inter prediction for the slice 402 corresponds to an upper area of 2560×720 pixels in 2560×736 pixels stored in the memory 314.

The DCT coefficient serving as an output from the DCT unit 302 is quantized by the quantization unit 304 and is input into the variable length encoding unit 306 and the inverse quantization unit 308. The variable length encoding unit 306 performs variable length encoding on the slices 402 and 404 but performs no variable length encoding on the slice 406. Thus, an output from the variable length encoding unit 306 corresponds to encoded data of the upper half of the input image, that is, of an image composed of 2560×720 pixels. The processing of the inverse quantization unit 308 and other processing are performed on the slice 406 as well.

By contrast, the lower small image is input into the encoder 106 and is segmented into three areas 502, 504, and 506 as illustrated in FIG. 5. The area 502 is composed of 2560×16 pixels, the area 504 is composed of 2560×16 pixels, and the area 506 is composed of 2560×704 pixels.

The deblock filtering control unit 322 controls the intra-prediction unit 320 and the switch 303 such that the slice 502 is encoded as an I slice of intra 8×8, that the slice 504 is encoded as a normal I slice, and that the slice 506 is encoded as a normal P slice.

The search range of inter prediction for the slice 506 corresponds to a lower area of 2560×720 pixels in 2560×736 pixels stored in the memory 314.

The variable length encoding unit 306 performs no variable length encoding on the slice 502 but performs variable length encoding on the slices 504 and 506. Thus, an output from the variable length encoding unit 306 corresponds to encoded data of the lower half of the input image, that is, of an image composed of 2560×720 pixels. The processing of the inverse quantization unit 308 and other processing are performed on the slice 502 as well.

The code combining unit 108 combines variable-length encoded data output from the encoder 104 and variable-length encoded data output from the encoder 106, and adds header information to the combined data serving as the original picture composed of 2560×1440 pixels.

As described above, the output data output from the code combining unit 108 is encoded data of the original picture composed of 2560×1440 pixels.

In the case where a picture is simply divided into two and then encoded, and output codes thereof are combined, no deblock filtering is performed on pixels on the boundary of division. If deblock filtering is performed, a processing result of deblock filtering performed in local decoding in encoding is different from a processing result of deblock filtering performed in decoding, resulting in deterioration in the image quality of a decoded image. In the encoded data according to the present embodiment, deblock filtering is performed on the pixels on the boundary of division. The present embodiment can make the processing result of deblock filtering performed in local decoding in encoding the same as the processing result of deblock filtering performed in decoding, thereby preventing deterioration in the image quality of a decoded image.

The following describes reasons of the advantageous effects and processing performed to achieve the advantageous effects and unique to the present embodiment.

Figure 6A:
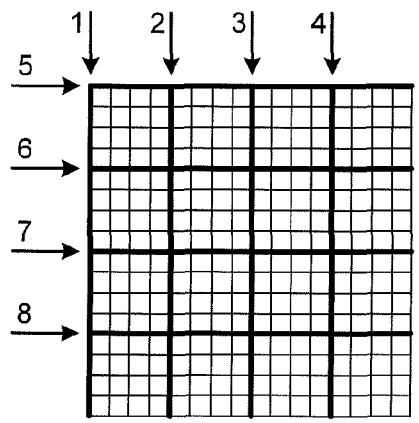
FIGS. 6A to 6C are views for explaining a filtering operation performed by a deblock filtering unit.
Figure 6B:
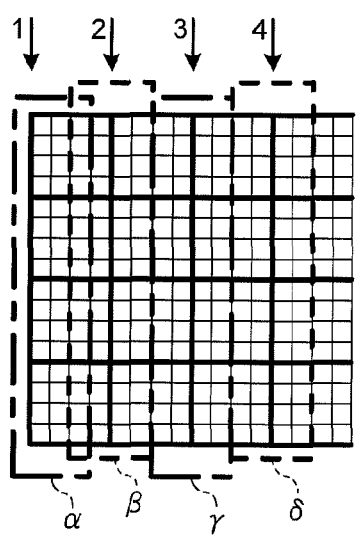
Figure 6C:
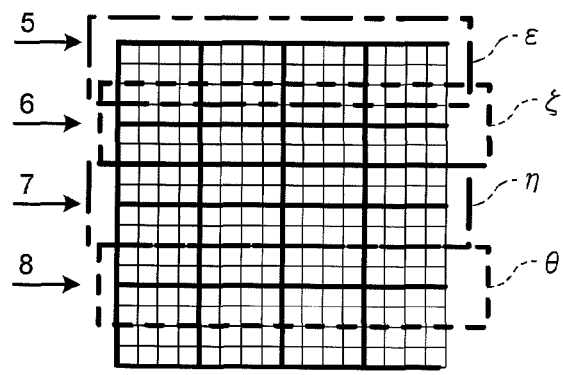

The filtering performed by the deblock filtering unit 312 specified in MPEG-4 AVC will be described in detail with reference to FIGS. 6A to 6C and FIG. 7. FIGS. 6A to 6C each illustrate one MB to be processed by the deblock filtering unit 312. The MB is composed of 16×16 pixels. In FIGS. 6A to 6C, thick lines represent block boundaries to be processed by the deblock filtering unit 312. The thick lines are employed when the size of the DCT block is determined to be 4×4 pixels.

The deblock filtering unit 312 performs filtering on the block boundaries first in the vertical direction, and performs filtering on the block boundaries then in the horizontal direction for each block of 4×4 pixels, which is the DCT block size in the MB. In other words, the filtering is performed in order of numbers assigned to respective arrows in FIG. 6A.

As illustrated in FIG. 6B, the maximum number of pixels to be replaced with the result of the filtering in the vertical-direction block boundaries is as follows: a vertical arrow 1 has three pixels positioned on the left and right of a vertical-direction block boundary serving as an MB boundary in a dotted frame α; and vertical arrows 2, 3, and 4 each have two pixels positioned on the left and right of a vertical-direction block boundary not serving as an MB boundary in dotted frames β, γ, and δ, respectively. As illustrated in FIG. 6C, the maximum number of pixels in the horizontal-direction block boundaries is as follows: a horizontal arrow 5 has three pixels positioned above and below a horizontal-direction block boundary serving as an MB boundary in a dotted frame ε; and horizontal arrows 6, 7, and 8 each have two pixels positioned above and below a horizontal-direction block boundary not serving as an MB boundary in dotted frames ζ, η, and θ, respectively.

Furthermore, each arrow has pixels not to be replaced with the result of the filtering but used for the filtering. The number of the pixels used for the above filtering is larger than that of the pixels to be replaced with the result of the filtering by one pixel on both sides. (In other words, the horizontal arrow 5 has four pixels above and below the block boundary that are input to the filtering, and three pixels above and below the block boundary are output therefrom. Similarly, the horizontal arrow 6 has three pixels above and below the block boundary that are input to the filtering, and two pixels above and below the block boundary are output therefrom.)

In the case where the size of the DCT block is 8×8 pixels, no filtering is performed on the block boundaries of the vertical arrows 2 and 4, and horizontal arrows 6 and 8. This is because these block boundaries are not the boundaries of blocks subjected to DCT operation.

The filtering in deblock filtering has dependencies with adjacent pixels. The deblock filtering unit 312 uses filtering results of MBs positioned above and on the left of an MB serving as a current filtering target, thereby performing filtering on the MB serving as the current filtering target.

The dependencies will be described with reference to FIG. 7.

Figure 7:
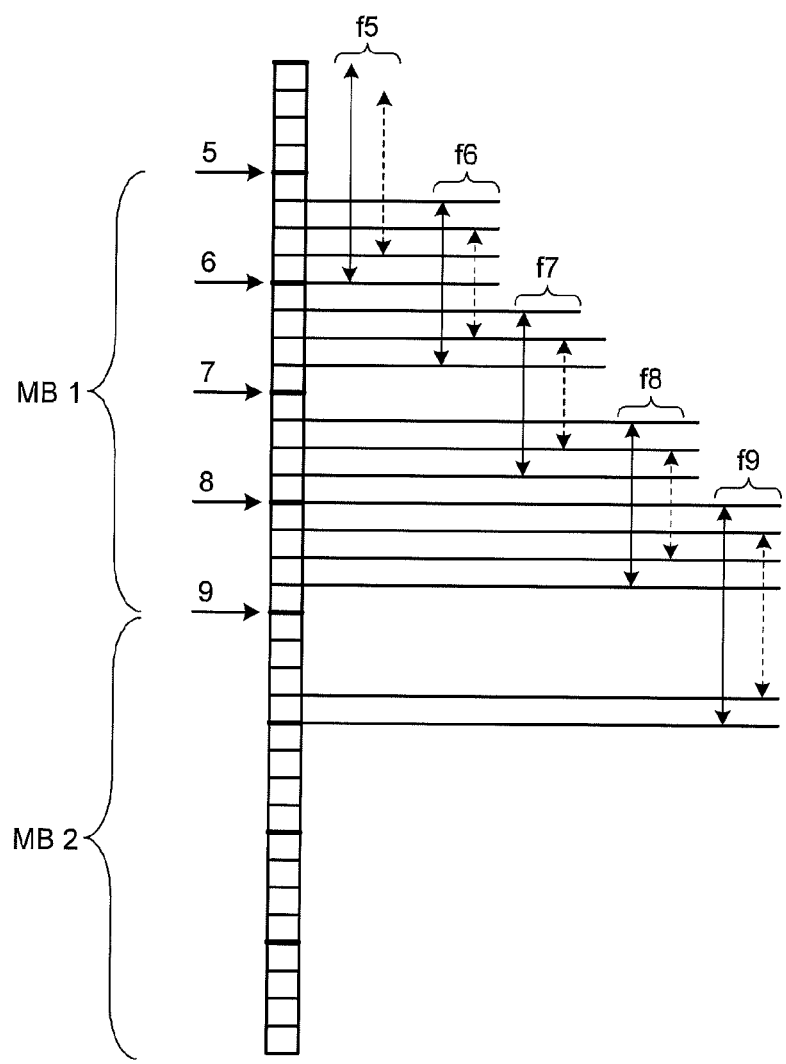
FIG. 7 is a view for explaining a filtering operation performed by the deblock filtering unit in block units of four pixels×four pixels.

FIG. 7 illustrates pixels in one column of an MB 1 and an MB 2 serving as two MBs vertically adjacent to each other. FIG. 7 illustrates deblock filtering performed on horizontal-direction block boundaries in the case where the size of the DCT block is specified to be 4×4 pixels. The arrows 5 and 9 each serve as an MB boundary, whereas arrows 6 to 8 each serve as a block boundary. A double-lined arrow in f6 represents a range of pixels used for filtering performed on the block boundary of the arrow 6. A dotted arrow in f6 represents a range of pixels to be replaced with the result of the filtering performed on the block boundary of the arrow 6. As described above, the number of the pixels used for the filtering is larger than that of the pixels to be replaced with the result of the filtering by one pixel on both sides. Similarly, f5, f7, f8, and f9 represent a range of pixels used for filtering performed on the block boundaries of the arrows 5, 7, 8, and 9, respectively, and a range of pixels to be replaced with the result of the filtering.

As is clear from FIG. 7, pixel values replaced with the result of the filtering of f5 are used for the filtering of f6. Similarly, a pixel value replaced with the result of the filtering of f6 is used for the filtering of f7; a pixel value replaced with the result of the filtering of f7 is used for the filtering of f8; and pixel values replaced with the result of the filtering of f8 are used for the filtering of f9. As a result, a filtering result of the MB 2 varies depending on pixels of the MB positioned above and adjacent to the MB 1.

In the images of FIG. 4 and FIG. 5 obtained by vertically dividing a screen into two, the pixels in the slice 404 are identical to the pixels corresponding thereto in the slice 502 before encoding is performed. Similarly, the pixels in the slice 406 are identical to the pixels corresponding thereto in the slice 504. Because a slice boundary is present between the slices 402 and 404, intra prediction performed on the blocks in the slice 404 use no pixel in the slice 402. As a result, pixel values of a result of the intra prediction performed on the blocks in the slice 404 are equal to those of a result of intra prediction performed on the blocks in the slice 502. Similarly, pixel values of the result of intra prediction performed on the blocks in the slice 406 are equal to those of the result of intra prediction performed on the blocks in the slice 504.

Further, given that no deblock filtering is performed, because the encoders 104 and 106 perform fixed quantization at the same quantization step, an encoding result of the slice 404 is the same as an encoding result of the slice 502 in the I small picture, and an encoding result of the slice 406 is the same as an encoding result of the slice 504. Because the slices 404, 406, 502, and 504 serve as I slices, similar results are obtained in the P small picture. Because prediction performed on the I slice is limited to intra prediction, no different reference block is selected for the internal blocks of the slice 404 and the internal blocks of the slice 502 to perform inter prediction.

If a moving image encoding device according to a conventional technology performs deblock filtering in local decoding, the pixel values of the pixels in the slice 404 are different from those of the pixels corresponding thereto in the slice 502; and the pixel values of the pixels in the slice 406 are different from those of the pixels corresponding thereto in the slice 504. This occurs because pixels are present above the slice 404 but no pixel is present above the slice 502.

What is described above will be explained in detail.

Filtering is performed on the pixels of the uppermost blocks in the slice 404 by using pixels adjacent thereto in the slice 402 positioned above the slice 404 with the MB boundary interposed therebetween. As described above with reference to FIG. 7, when DCT is performed in units of 4×4 pixels in the slice 404, deblock filtering affects pixels positioned at a lower part of the slice 404. In deblock filtering on the MB boundary serving as the boundary between the slice 404 and the slice 406, the filtering is performed using the affected pixels. As a result, the pixels of the slice 406 are affected by the pixels of the slice 402 as well.

The upper side of the slice 502 serves as an end of the screen, and no deblock filtering is performed on the end of the screen. As a result, the pixel values of the pixels positioned at an upper part of the slice 502 are different from those of the slice 404. If DCT is performed in units of 4×4 pixels in the slice 502, deblock filtering affects pixels positioned at a lower part of the slice 502. In deblock filtering on the MB boundary serving as the boundary between the slice 502 and the slice 504, the filtering is performed using the affected pixels. As a result, the pixel values of the pixels in the slice 504 subjected to the deblock filtering are different from those of the pixels corresponding thereto in the slice 406.

The output code according to the present embodiment does not include results obtained by performing variable length encoding on the slice 406 and the slice 502. To decode the output code, decoding is performed based on an assumption that the slice 504 is arranged below and adjacent to the slice 404. In other words, in deblock filtering on the MB boundary between the slice 404 and the slice 504, the filtering is performed by using the pixels of the lowermost blocks in the slice 404 and the pixels of the uppermost blocks in the slice 504.

In other words, to carry out local decoding in encoding, filtering is performed using the pixels of the slice 404 and the pixels of the slice 406, thereby calculating the pixel values of the pixels positioned at the lower part of the slice 404. By contrast, to carry out decoding, filtering is performed by using the pixels of the slice 404 and the pixels of the slice 504, thereby calculating the pixel values of the pixels positioned at the lower part of the slice 404. If the pixel values in the slice 504 are different from those of the pixels corresponding thereto in the slice 406, the processing result of deblock filtering performed in the local decoding in the encoding is different from the processing result of deblock filtering performed in the decoding.

Similarly, to carry out local decoding in encoding, filtering is performed using the pixels of the slice 502 and the pixels of the slice 504, thereby calculating the pixel values of the pixels positioned at an upper part of the slice 504. By contrast, to carry out decoding, filtering is performed by using the pixels of the slice 404 and the pixels of the slice 504, thereby calculating the pixel values of the pixels positioned at the upper part of the slice 504. When the pixel values in the slice 502 are different from those of the pixels corresponding thereto in the slice 404, the processing result of deblock filtering performed in the local decoding in the encoding is different from the processing result of deblock filtering performed in the decoding.

If all the DCT blocks in the slice 504 and the slice 506 are composed of 4×4 pixels, deblock filtering causes the values of the pixels positioned at the upper part of slice 504 to affect the values of the pixels of the entire slice 504 and slice 506. As a result, the processing result of deblock filtering performed in the local decoding in encoding is different from the processing result of deblock filtering performed in the decoding in the entire slice 504 and slice 506.

The result of the deblock filtering performed in the local decoding in the encoding is stored in the memory 314 and is used as a reference image for a P slice in other small pictures, for example. Similarly, the result of the deblock filtering performed in the decoding is used as a reference image. Difference between the reference image in the encoding and the reference image in the decoding causes an error in decoding of inter prediction in the decoding, resulting in deterioration in the image quality of a decoded image.

By contrast, the deblock filtering control unit 322 according to the present embodiment performs control as described above. Specifically, the slice 404 and the slice 502 in the I small picture and the slice 404 and the slice 502 in the P small picture are encoded as I slices of intra 8×8.

The following describes the reason why the slices are encoded as I slices of intra 8×8.

In an I slice of intra 8×8, prediction is performed in units of blocks of 8×8 pixels in the intra-prediction mode as described above. The purpose of this is to perform control such that DCT is performed in units of blocks of 8×8 pixels. As described above, MPEG-4 AVC specifies that DCT is performed in units of blocks of 8×8 pixels in the mode for performing intra prediction in units of blocks of 8×8 pixels.

Figure 8:
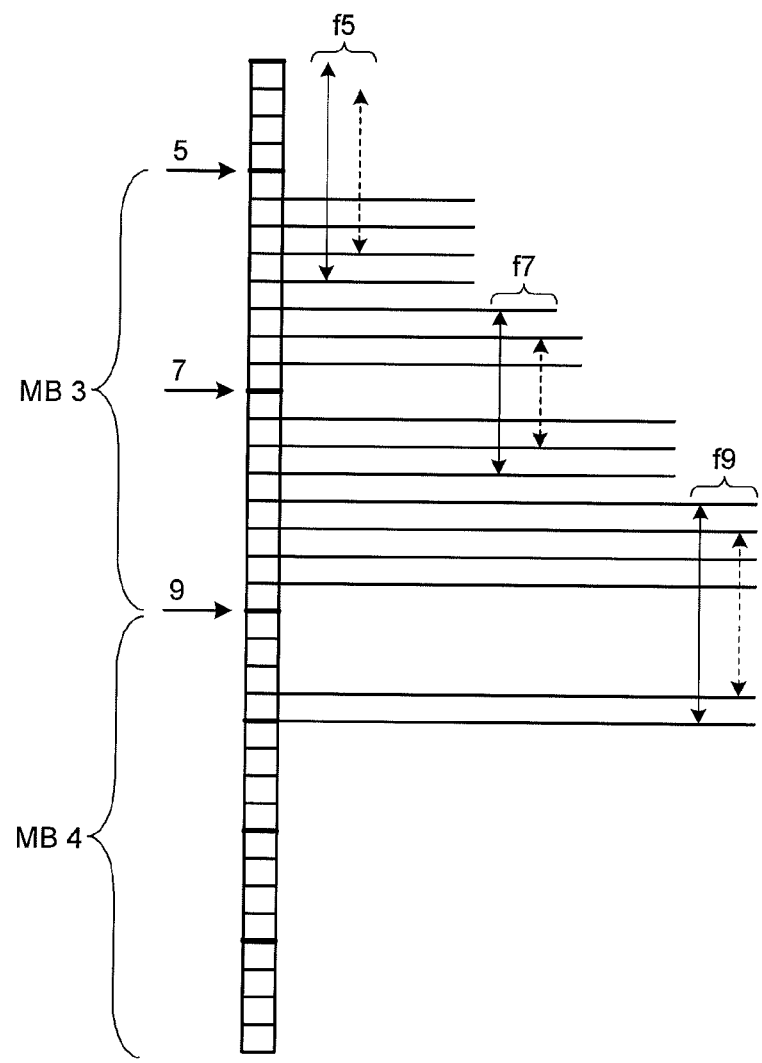
FIG. 8 is a view for explaining a filtering operation performed by the deblock filtering unit in block units of eight pixels×eight pixels.

FIG. 8 illustrates the case where the DCT size is determined to be 8×8 pixels similarly to the case of FIG. 7. In two MBs arranged vertically adjacent to each other as illustrated in FIG. 8, if the DCT size of an MB 3 positioned above the MB boundary is 8×8 pixels, no block boundary corresponding to the horizontal arrow 6 and the horizontal arrow 8 in FIG. 7 is present. As is clear from FIG. 8, no pixel value replaced with the result of the filtering of f5 is used for the filtering of f7. Similarly, no pixel value replaced with the result of the filtering of f7 is used for the filtering of f9. As a result, a processing result of an MB 4 does not vary depending on pixels of an MB positioned above and adjacent to the MB 3.

Because the slice 502 serves as the end of the screen, the filtering of f5 is not performed on the slice 502. By contrast, the filtering of f5 is performed in the slice 404. As a result, the pixel values of the pixels positioned at the upper part of the slice 404 are different from those of the pixels positioned at the upper part of the slice 502 after the deblock filtering is performed. The influence is not exerted on the pixel values of the pixels positioned at the lower part of the slice 404 or the pixel values of the pixels positioned at the lower part of the slice 502. The influence is not exerted on the pixel values of the pixels in the slice 406 or the pixel values of the pixels in the slice 504 as well.

In other words, unlike the moving image encoding device according to the conventional technology, the pixel values of the pixels positioned at the lower part of the slice 404 are equal to those of the pixels positioned at the lower part of the slice 502 after the deblock filtering is performed. In addition, the pixel values of the pixels in the slice 406 are equal to those of the pixels in the slice 504.

Thus, the processing result of deblock filtering performed on the pixels in the slice 504 in local decoding in encoding is the same as the processing result of deblock filtering performed in decoding. This applies to the pixels of the slice 506 even when all the DCT blocks in the slice 504 and the slice 506 are 4×4 pixels.

As described above, the present embodiment can make the reference image in encoding identical to the reference image in decoding, thereby preventing an error in decoding of inter prediction in the decoding. This can prevent deterioration in the image quality of a decoded image.

As described above, the moving image encoding device according to the present embodiment performs the following processing: an image is divided into a first small image (the areas 204 and 206 on the upper side) and a second small image (the areas 208 and 210 on the lower side) such that boundary areas overlap with each other; the small images are each segmented into a first area (the slice 406 and the slice 502) serving as an overlapping boundary area, a second area (the slice 404 and the slice 504) adjacent to the first area, and the other area (the slice 402 and the slice 506); the first area (slice 406) of the first small image and the second area (slice 504) of the second small image are encoded by using the same encoding parameter (quantized with the same quantization step as normal I slices); the second area (slice 404) of the first small image and the first area (slice 502) of the second small image are encoded by using the same encoding parameter (quantized with the same quantization step as I slices of intra 8×8); and DCT is performed on the second area (slice 404) of the first small image and the first area (slice 502) of the second small image by limiting the DCT size to 8×8 pixels, which is a second size. Thus, the moving image encoding device according to the present embodiment provides the following advantageous effects compared with the conventional method. A first size is 4×4 pixels.

1. By dividing an image and performing encoding in parallel, the moving image encoding can be done at a lower cost compared with the case where another high-performance moving image encoding device is newly provided.

2. The deblock filtering can be done on a block boundary serving as the boundary of the two images obtained by the division, thereby preventing the dividing line of the image from being conspicuous.

3. The moving image encoding can be done with no error without special processing performed at a decoding side, thereby preventing deterioration in the image quality of a decoded image. As a result, no dedicated decoding device is required.

While the images of the moving image to be encoded are each composed of 2560×1440 pixels in the present embodiment, any other number of pixels may be employed as long as the size of the images is equal to or larger than an appropriate size both in the horizontal and vertical directions.

While an image is vertically divided into two in a manner overlapping with each other by one MB line (206 and 208 in FIG. 2) in the present embodiment, the images may overlap with each other by two or more MB lines.

The image may be divided not vertically but horizontally. The following describes an example in which an image is horizontally divided with reference to FIG. 9 and FIG. 10. The explanation will be made only of points different from those in the case where an image is vertically divided.

Figure 9:
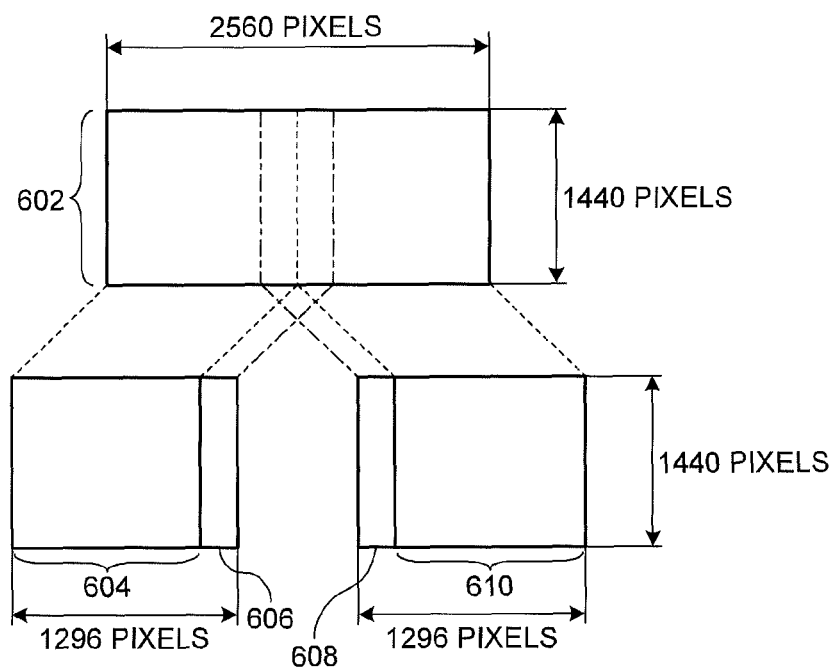
FIG. 9 is a view for explaining another example of division of a moving image according to the first embodiment.

An input moving image is divided into two left and right small images by the image dividing unit 102 illustrated in FIG. 1 in a manner overlapping with each other by one MB column (a column in the vertical direction of one MB width). As illustrated in FIG. 9, an input image 602 composed of 2560×1440 pixels is divided into two small images composed of 1296×1440 pixels, one of which is formed of areas 604 and 606, and another of which is formed of areas 608 and 610.

Figure 10A:
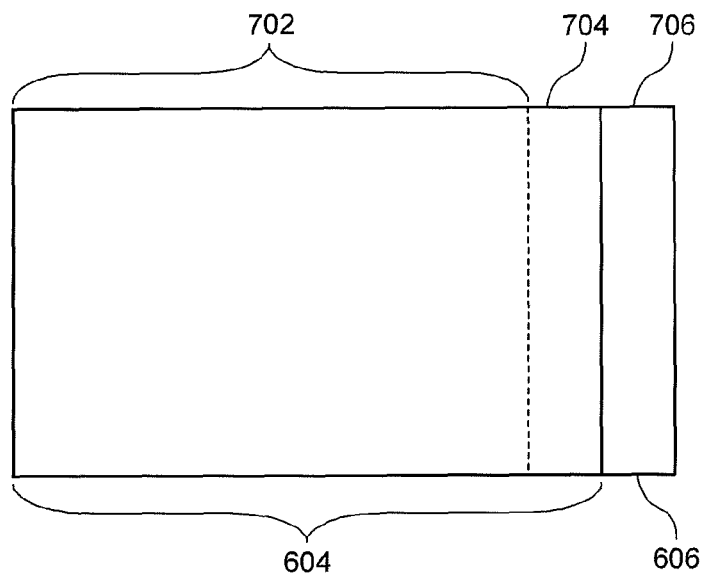
FIGS. 10A and 10B are views for explaining encoding of an image obtained by division in the another example of division according to the first embodiment.

As illustrated in FIG. 10A, the left small picture is segmented into three areas 702, 704, and 706 by the encoder 104 illustrated in FIG. 3. These three areas each serve as a slice. The area 702 is a slice composed of 1264×1440 pixels, the area 704 is a slice composed of 16×1440 pixels, and the area 706 is a slice composed of 16×1440 pixels. In an I small picture, the deblock filtering control unit 322 controls the intra-prediction unit 320 and the switch 303 such that the slices 702 and 706 are encoded as normal I slices and such that the slice 704 is encoded as an I slice of intra 8×8.

In a P small picture, the deblock filtering control unit 322 controls the intra-prediction unit 320 and the switch 303 such that the slice 702 is encoded as a normal P slice, that the slice 704 is encoded as an I slice of intra 8×8, and that the slice 706 is encoded as a normal I slice.

Variable length encoding is performed on the slice 702 and the slice 704 out of a quantized signal serving as an output from the quantization unit 304 illustrated in FIG. 3, but no variable length encoding is performed on the slice 706.

Figure 10B:
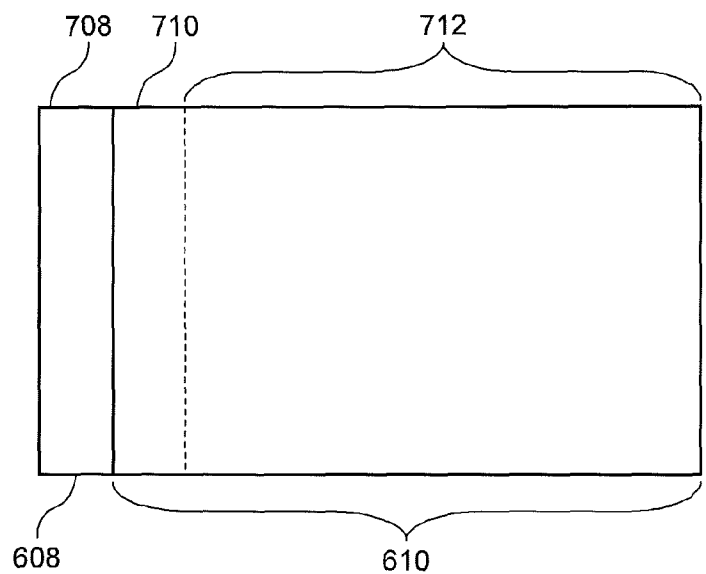

As illustrated in FIG. 10B, the right small picture is segmented into three areas 708, 710, and 712 by the encoder 104 illustrated in FIG. 3. These three areas each serve as a slice. The area 708 is a slice composed of 16×1440 pixels, the area 710 is a slice composed of 16×1440 pixels, and the area 712 is a slice composed of 1264×1440 pixels. In an I small picture, the deblock filtering control unit 322 controls the intra-prediction unit 320 and the switch 303 such that the slices 710 and 712 are encoded as normal I slices, and that the slice 708 is encoded as an I slice of intra 8×8.

In a P small picture, the deblock filtering control unit 322 controls the intra-prediction unit 320 and the switch 303 such that the slice 708 is encoded as an I slice of intra 8×8, that the slice 710 is encoded as a normal I slice, and that the slice 712 is encoded as a normal P slice.

Variable length encoding is performed on the slice 710 and the slice 712 out of a quantized signal serving as an output from the quantization unit 304 illustrated in FIG. 3, but no variable length encoding is performed on the slice 708.

As described above, the moving image encoding device according to the present embodiment performs the following processing: an image is divided into a first small image (the areas 604 and 606 on the left) and a second small image (the areas 608 and 610 on the right) such that boundary areas overlap with each other; the small images are each segmented into a first area (the slice 706 and the slice 708) serving as an overlapping boundary area, a second area (the slice 704 and the slice 710) adjacent to the first area, and the other area (the slice 702 and the slice 712); the first area (slice 706) of the first small image and the second area (slice 710) of the second small image are encoded using the same encoding parameter (quantized with the same quantization step as normal I slices); the second area (slice 704) of the first small image and the first area (slice 708) of the second small image are encoded using the same encoding parameter (quantized with the same quantization step as I slices of intra 8×8); and DCT is performed on the second area (slice 704) of the first small image and the first area (slice 708) of the second small image by limiting the DCT size to 8×8 pixels, which is the second size. Also in the case where the image is horizontally divided, the moving image encoding device according to the present embodiment can provide the same advantageous effects as those in the case where the image is vertically divided.

While an image is evenly divided vertically or horizontally in the present embodiment, the image is not necessarily evenly divided and may be divided into three or more. While the shapes of divided images and slices are rectangles, the shapes are not necessarily rectangles.

Other Embodiments

Figure 11:
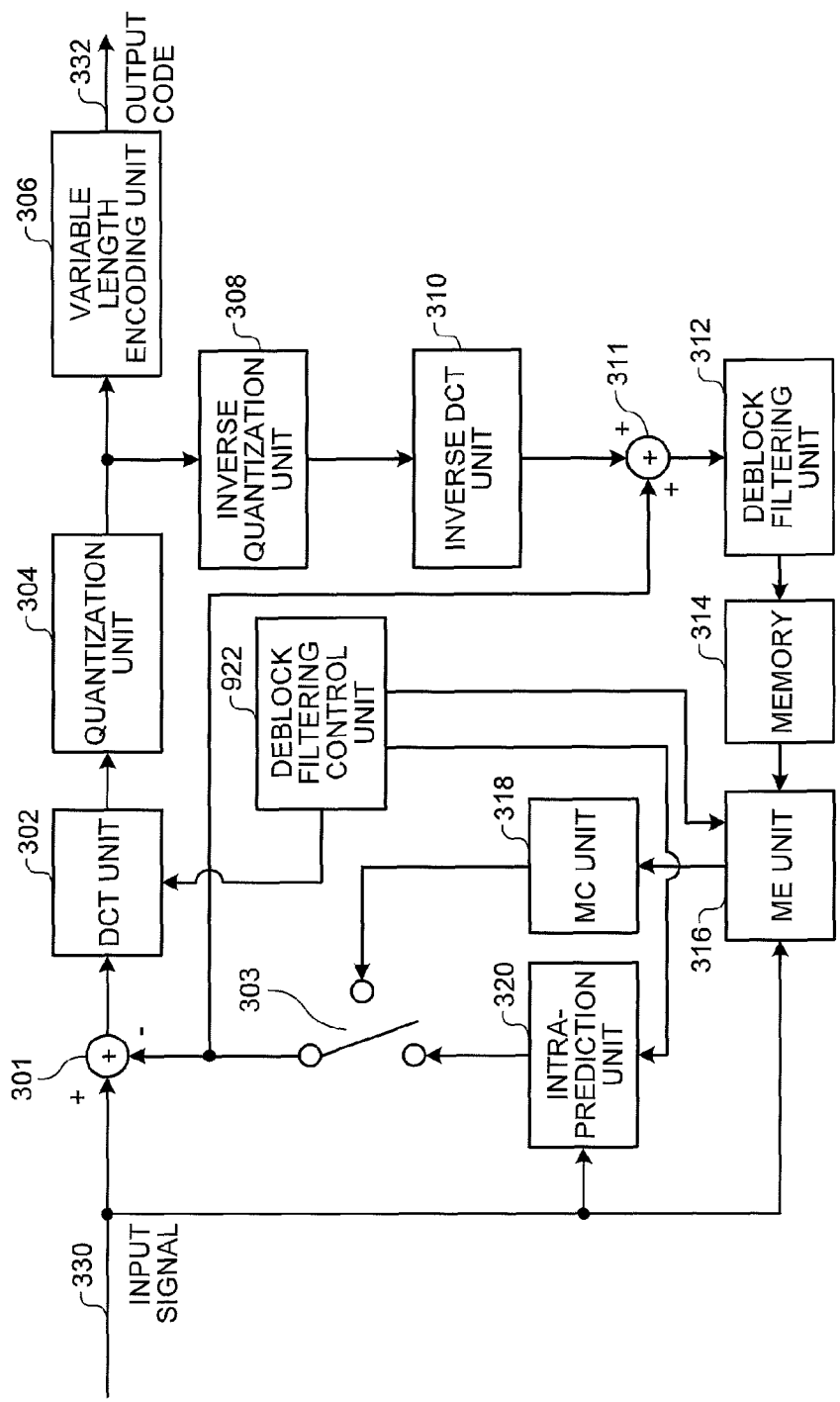
FIG. 11 is a block diagram of an encoder according to other embodiments.

Other embodiments will be described with reference to FIG. 11. The explanation will be made only of points different from those in the first embodiment.

To vertically divide an input moving image, the first embodiment performs control such that the slice 404 is encoded as an I slice of intra 8×8 and that the slice 406 is encoded as a normal I slice in a P small picture. The first embodiment also performs control such that the slice 502 is encoded as an I slice of intra 8×8 and that the slice 504 is encoded as a normal I slice.

The other embodiment performs control such that these slices are encoded as P slices. In the case of P slices, inter prediction is performed between the P slices and an I small picture. To make the pixel values of prediction results of the slice 404 and the slice 502 equal even when the inter prediction is performed, a deblock filtering control unit 922 performs the following control. Similarly, to make the pixel values of prediction results of the slice 406 and the slice 504 equal, the deblock filtering control unit 922 performs the following control.

An encoder 104 that encodes the upper small picture has no image area corresponding to the slice 506. An encoder 106 that encodes the lower small picture has no image corresponding to the slice 402.

Thus, the deblock filtering control unit 922 controls an ME unit 316, thereby limiting a reference range used for inter prediction of the slices 404 and 406 to a part of the slices 404 and 406 in the I small picture. Similarly, the deblock filtering control unit 922 limits a reference range used for inter prediction of the slices 502 and 504 to a part of the slices 502 and 504 in the I small picture. To simplify the explanation, a prediction signal used for ME indicates only integer pixel accuracy.

As a result, same reference pixels are selected in the inter prediction of the slices 404 and 406 and the inter prediction in the slices 502 and 504. Because the pixel values of upper three pixels in the slice 404 and the slice 502 vary depending on whether deblock filtering is performed or not, the upper three pixels in the slices are also excluded from the reference range. Similarly, because the pixel values of lower three pixels in the slice 406 and the slice 504 vary depending on whether deblock filtering is performed or not, the lower three pixels in the slices are also excluded from the reference range.

In inter prediction, there is no limitation between the block size used in the inter prediction and the block size of DCT. When a switch 303 selects inter prediction for the slice 404 and the slice 502, the deblock filtering control unit 922 illustrated in FIG. 11 controls a DCT unit 302 so as to perform DCT in units of 8×8 pixels.

The deblock filtering control unit 922 controls an intra-prediction unit 320 such that the intra-prediction mode for the slice 404 and the slice 502 is fixed to the mode for performing prediction in units of blocks of 8×8 pixels in the intra-prediction unit 320.

As a result, DCT in units of 8×8 pixels is performed on all the pixels in the slice 404 and the slice 502. Thus, no influence of deblock filtering is exerted on the pixels in the slice 406 or the pixels in the slices 504 and 506, thereby making the reference image in encoding identical to the reference image in decoding similarly to the first embodiment. This can prevent an error in decoding of inter prediction in the decoding and deterioration in the image quality of a decoded image.

As described above, a slice serving as an I slice in the first embodiment serves as a P slice in the present embodiment in the P small picture. This enables efficient compression through inter prediction. In other words, it is possible to provide a higher-quality decoded image with same output code quantity.

While the I picture and the P picture are encoded in the embodiment, a B picture can be encoded in the same manner as of the P picture.

In other words, control is performed such that the slice 404 of FIG. 4 is encoded as an I slice of intra 8×8, that the slice 406 is encoded as a normal I slice, that the slice 502 of FIG. 5 is encoded as an I slice of intra 8×8, and that the slice 504 is encoded as a normal I slice. The other slices are determined to be B slices.

Alternatively, the slices 404, 406, 502, and 504 may be determined to be B slices. In this case, the reference range used for inter prediction is limited similarly to the case of the P small picture described above. When the switch 303 selects inter prediction for the slice 404 and the slice 502, the DCT unit 302 is controlled so as to perform DCT in units of 8×8 pixels.

While the encoding is performed with a fixed quantization step in the embodiments, the quantization step may be variable. In this case, however, it is necessary to use the same quantization parameter for a block in the slice 404 and a block corresponding thereto in the slice 502. The slice 502 is quantized first, and the quantization parameter determined for each MB is transmitted from the encoder 106 to the encoder 104. When quantizing a corresponding MB in the slice 404, the encoder 104 uses the transmitted quantization parameter, thereby performing the quantization with the same quantization parameter. Similarly, the slice 406 and the slice 504 are quantized with the same quantization parameter.

Making the quantization step variable enables efficient compression. In other words, it is possible to provide a higher-quality decoded image with the same output code quantity.

A signal of ½ pixel accuracy or ¼ pixel accuracy may be employed as the prediction signal used for ME. This increases the prediction accuracy, thereby enabling efficient compression.

While no variable length encoding is performed on the slices 406 and 502 in the embodiments, the slice 406 and the slice 502 may be subjected to variable length encoding, and the resultant encoded data may be discarded by the code combining unit 108.

While the encoder 104 and the encoder 106 operate individually, the encoder 104 may use the result of the encoder 106. Transmission of output data of the slices 502 and 504 output from the adder 311 to the encoder 104 enables the encoder 104 to skip an arithmetic operation of the slices 404 and 406, resulting in reduced power consumption.

The operation of moving image encoding may be performed by a computer program. The moving image encoding program may be stored in various types of a non-transitory computer-readable medium and supplied to a computer. The non-transitory computer-readable medium includes various types of a tangible storage medium. Examples of the non-transitory computer-readable medium include a magnetic recording medium (e.g., a flexible disk, a magnetic tape, and a hard disk drive), a magneto-optical recording medium (e.g., a magneto-optical disc), a compact disc read only memory (CD-ROM), a compact disc recordable (CD-R), a compact disc recordable/rewritable (CD-R/W), and a semiconductor memory (e.g., a mask ROM, a programmable ROM (PROM), an erasable PROM (EPROM), a flash ROM, and a random access memory (RAM)).

The moving image encoding program may be stored in various types of a transitory computer-readable medium and supplied to the computer. Examples of the transitory computer-readable medium include an electrical signal, an optical signal, and an electromagnetic wave. The transitory computer-readable medium can supply a noise eliminating program to the computer via a wired communication path, such as an electric wire and an optical fiber, or a wireless communication path.

Besides the case where the computer executes the moving image encoding program that provides functions according to the embodiments, thereby providing the functions according to the embodiments, the embodiments of the embodiment include the following case: the moving image encoding program cooperates with an operating system (OS) or application software operating on the computer, thereby providing the functions according to the embodiments.

The present embodiment can provide a moving image encoding device, a moving image encoding method, and a computer program product that includes moving image encoding program that can achieve lower-cost encoding by dividing an image to perform the encoding, perform decoding without a dedicated decoding unit, and prevent deterioration in the image quality caused by the division of the image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A moving image encoding method comprising:
dividing an input image of a digital image signal to be encoded into a plurality of small images including a first small image and a second small image such that a boundary area of the first small image overlaps that of the second small image;
performing an encoding operation in parallel on the small images obtained by the division to acquire encoded data;
combining the encoded data excluding an overlapping area; and
outputting the combined encoded data as encoded data of the input image, wherein the encoding operation comprises:
generating a difference value between the input small images and a prediction signal obtained by motion compensation prediction or in-screen prediction;
performing orthogonal transform on the difference value in a unit of an orthogonal transform block of a first size determined in advance or in a unit of an orthogonal transform block of a second size that is larger than the first size, thereby obtaining a transform coefficient;
performing quantization on the obtained transform coefficient, thereby generating a quantized signal;
adding a signal obtained by performing inverse quantization and inverse orthogonal transform on the quantized signal to the prediction signal, thereby generating a local decoding image signal;
performing filtering on the local decoding image signal based on the size of the orthogonal transform block, thereby reducing block noise;
dividing a screen of the local decoding image signal, in a horizontal direction or a vertical direction, such that each of the first small image and the second small image are divided into a first area serving as the overlapping boundary area, a second area that is adjacent to the first area, and a third area that is other than the first and second areas;
setting and instructing
to encode the first area of the first small image and the second area of the second small image with a same encoding parameter and
to encode the second area of the first small image and the first area of the second small image with a same encoding parameter; and
setting and instructing to perform orthogonal transform on the second area of the first small image and the first area of the second small image in the unit of the orthogonal transform block of the second size.

2. A non-transitory computer-readable medium storing a program causing a computer to execute the moving image encoding method according to claim 1.

* * * * *